(12) United States Patent
Huber et al.

(10) Patent No.: US 6,254,281 B1
(45) Date of Patent: Jul. 3, 2001

(54) OPTICAL CONNECTOR HOUSING AND METHOD FOR CONNECTING OPTICAL LINES

(75) Inventors: Hans-Peter Huber, Neu-Ulm; Manfred Rode, Senden, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/271,861

(22) Filed: Mar. 18, 1999

(30) Foreign Application Priority Data

Mar. 18, 1998 (DE) .............................. 198 11 705

(51) Int. Cl.$^7$ ...................................... G02B 6/38
(52) U.S. Cl. .................. 385/73; 385/56; 385/74
(58) Field of Search .................. 385/49, 50, 53, 385/55, 56, 73, 74, 88, 93, 134, 135

(56) References Cited

U.S. PATENT DOCUMENTS

| 4,470,662 | 9/1984 | Mumzhiu | 385/19 |
| 4,621,895 | * 11/1986 | Motsko | 385/73 X |
| 4,712,863 | * 12/1987 | Heng et al. | 385/55 |
| 5,446,814 | * 8/1995 | Kuo et al. | 385/49 X |
| 5,544,273 | * 8/1996 | Harrison | 385/135 |

FOREIGN PATENT DOCUMENTS

| 3729075C2 | 3/1989 | (DE) . |
| 4240460C2 | 6/1994 | (DE) . |

* cited by examiner

*Primary Examiner*—John D. Lee
(74) *Attorney, Agent, or Firm*—Venable; Norman N. Kunitz

(57) ABSTRACT

A connecting housing for optical transmission lines, consisting of an upper and a lower housing part, which are joined in the manner of a snap fastener. Once the housing is connected, a free beam distance appears between the optical transmission lines, in which optical elements are arranged for focussing and/or deflecting the light beam.

12 Claims, 1 Drawing Sheet

OPTICAL CONNECTOR HOUSING AND METHOD FOR CONNECTING OPTICAL LINES

BACKGROUND OF THE INVENTION

The invention concerns an optical connecting housing for optical transmission lines, as well as a connecting method.

The invention is used for short-distance optical connections between optical transmission lines, e.g. beam waveguides, fibers, leads, cables, or an optical transmission line with optical converters, e.g. transmitter modules and receiver modules.

Different types of connectors exist for the detachable connection of optical transmission lines or for connecting these lines to optical converters. Inserting a plug pin 1 into a guide sleeve 2 determines the lateral positioning and the axial alignment of the beam axis for the optical transmission line, wherein the jacket surface of the sleeve serves to guide and align the plug pin and the optical transmission line 3 (FIG. 1), which is arranged in its center. The plug pin must be inserted with a sufficient length into the sleeve to ensure a good axial guidance. Connectors of this type must have an additional free space for joining or separating this connection, so that the pin can be inserted into or pulled from the sleeve and the optical transmission line can be deflected lengthwise and to the side, taking into consideration the permissible curvature radius of the optical transmission line.

Furthermore, lens-type connectors with expanded parallel beam are known, for which a short free beam distance is bridged between the optical transmission lines inside the guide sleeve. In order to avoid coupling losses caused by the expanded bundle of light rays exiting the optical transmission line, collimation lenses are arranged between the line ends, in such a way that parallel light bundles bridge the free beam distance.

It is the object of the invention to provide a connecting housing for optical transmission lines, which housing has a short, compact structural design, as well as to specify a method for the simple and flexible connecting and separating of the optical transmission lines.

SUMMARY OF THE INVENTION

The connection according to the invention between optical transmission lines or the joining of optical transmission lines to optoelectronic modules occurs in the manner of a snap fastener. The connecting housing consists of an upper and a lower housing part with a circular housing bottom and a housing wall. The housing parts can be joined by snapping them together under pressure and can be separated again by pulling them apart. Consequently, the connecting housing has a compact design with a diameter of approximately 15 mm and a height of approximately 5–10 mm. The optical transmission lines are advantageously inserted into the connecting housing, parallel to the housing bottom, through openings in the housing wall, so that the joining and separating of the housing parts take place perpendicular to the line direction. As a result, the optical transmission lines can be connected or separated perpendicular to the line axis.

A further advantage is that once assembled, the upper and lower housing parts can be rotated freely in the contact plane, thereby allowing an optional change for the direction of the optical transmission lines in one plane.

The invention is described in the following with the aid of exemplary embodiments and by taking into account schematic drawings.

DETAILED DESCRIPTION OF THE PREFERRED EMBODIMENTS

Figure 1:
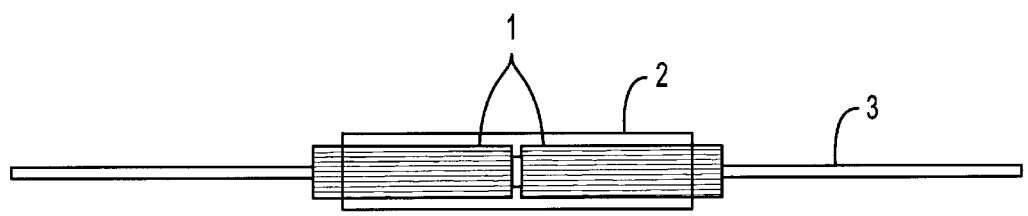
FIG. 1 Shows a state of the art connector plug.
Figure 2:
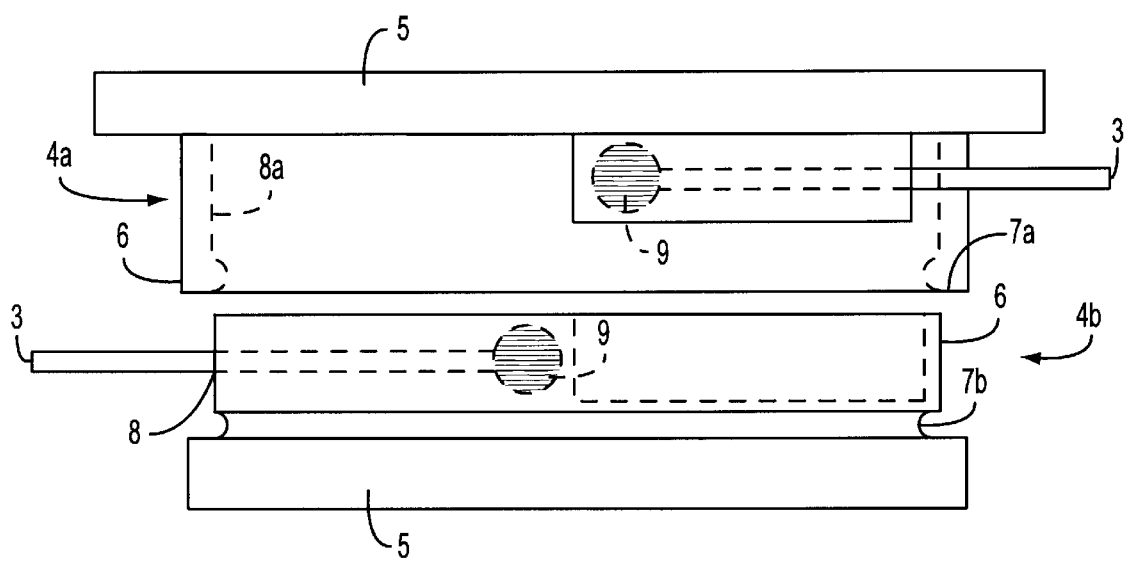
FIG. 2 Represents a connecting housing where the optical transmission lines are arranged in a fixed orientation to each other.

In a first exemplary embodiment according to FIG. 2, the connecting housing consists of an upper and a lower housing part 4a, 4b. The housing parts are formed from a circular housing bottom 5 and a housing wall 6. The housing wall of the upper housing part is designed to be resilient, e.g., with a thin, springy, flat part or as a circle of springs with latch-in nipple 7a. Suitable materials for producing the housing parts are, for example, metal or plastic materials.

A groove 7b is inserted into the housing wall of the lower housing part 4b, directly adjacent to the housing bottom. Both housing parts contain openings 8 in the housing wall into which, for example, respectively one optical transmission line 3 can be inserted. The openings 8 in the housing wall are, for example, bores with a guide sleeve for the optical transmission lines or simply bores in the housing wall, provided the thickness of the housing wall is sufficient for a stable guidance and securing of the optical transmission lines. The housing walls contain additional openings 8a, e.g., slots in the housing wall or, in the case of housing parts with guide sleeves, openings having the cross section of the guide sleeve at those locations where the optical transmission lines from the other housing part must be inserted into the housing during the joining of the housing parts.

When the housing parts are joined in the manner of a snap fastener, the upper housing part is pushed into the annular groove 7b of the lower housing part. The openings in the housing parts are arranged and designed such that once the housing parts are joined, the optical transmission lines extend parallel to the housing bottom, and only a short free beam distance exists between the lines to be connected. To avoid coupling losses caused by expansion of the bundle of light rays exiting the optical transmission line, optical elements 9, e.g., collimation lenses, are provided at the line ends inside the housing, for example on the housing bottom or the guide sleeve, such that the free beam distance is bridged by a parallel bundle of light rays. If the optical transmission lines to be connected are not arranged in the same optical beam axis, but are arranged at different angles to each other in the contact plane of the housing, then the bundle of light rays for an optical transmission line is deflected to the respectively other optical transmission line by inserting an optical element into the beam path, e.g., a deflection prism or a mirror. The optical elements are mounted, for example, on the lower housing bottom for a hybrid configuration or they are integrated into the housing bottom with the aid of suitable injection-molding processes for a monolithic configuration.

In order to separate the housing parts, for example, the upper housing bottom has a larger diameter than the housing wall and the lower housing part. As a result, the upper housing part can be separated from the lower housing part by pulling on this overhang.

Figure 3:
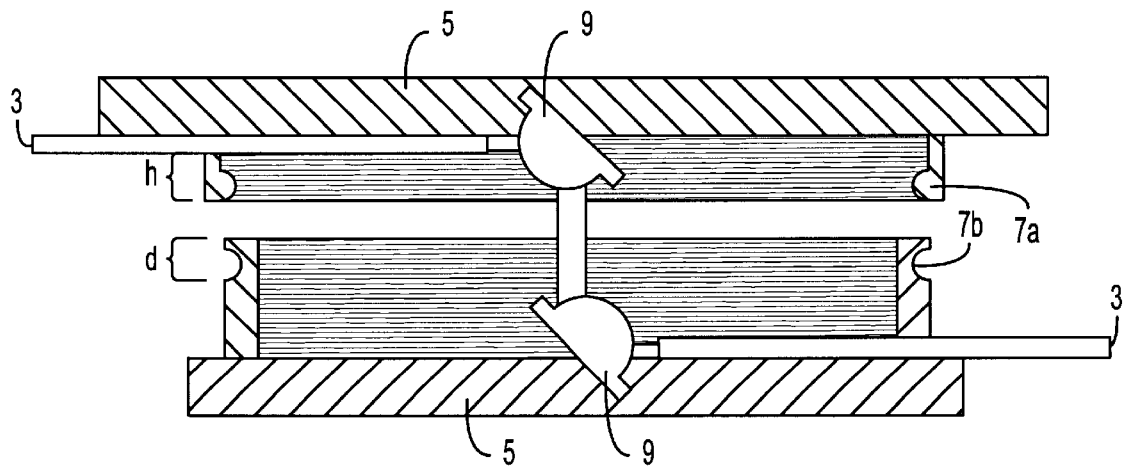
FIG. 3 Represents a connecting housing where the optical transmission lines can be turned optionally, relative to each other, in a plane.

In a second exemplary embodiment according to FIG. 3, the optical transmission lines 3 are inserted into the connecting housing through openings directly adjacent to the housing bottom 5. The optical transmission lines are secured, for example, by a guide sleeve arranged on the housing bottom. A groove 7 is inserted into the housing wall of the lower housing part, above the openings for the optical transmission lines. The distance d between groove 7 and the upper housing wall edge corresponds approximately to the housing wall height h of the upper housing part. In the upper housing part, a snap-in nipple 7a, the shape of which matches the groove shape, is provided on the inside edge of the housing wall, so that the upper housing part snaps into the lower housing part when the two housing parts are joined. Owing to the fact that the upper housing part is provided with a housing bottom that projects over the lower housing part, the housing parts can be separated again by pulling them apart.

The advantage of such an arrangement of the optical transmission lines is that when the housing parts are joined, they can be moved freely in the contact plane and the optical transmission lines can be arranged at optional angles to each other in the contact plane. It is advantageous if the optical transmission lines are arranged perpendicular to the contact plane of the housing parts, one above the other and at an angle of 90°. A deflection of the beam by 90° and a collimation of the light beams in the free beam distance between the optical transmission lines occur at the same time through optical elements 9, e.g., a semicircular lens with mirrored surface. These optical elements are connected at the respective ends of the optical transmission lines, for example, with the housing bottom or are integrated into the housing bottom.

Another exemplary embodiment with a beam deflection of 90° provides that the optical transmission lines are inserted into the connecting housing through openings in the housing bottom of a housing part. Otherwise, the housing parts and the optical elements are designed in accordance with the second exemplary embodiment. This connection is particularly suitable for plug-in cards with an optical transmission line for a back plane. The connecting housing according to the invention can also be used for connecting an optical transmission line to optoelectronic modules e.g., transmitters/receivers. In that case, one housing part is attached to the optical module as a sleeve while the optical transmission line is connected with the other housing part. However, the optical modules can also be integrated into a housing part as chip, e.g. into the housing bottom, and the optical transmission lines are fed to the chips, for example through openings in the housing bottom.

What is claimed is:

1. A connecting housing for optical transmission lines, said housing comprising elements for guiding light ray bundles, wherein
    the connecting housing is composed of an upper and a lower housing part, each having a circular housing bottom and a housing wall containing openings for the optical transmission lines;
    the lower housing wall is provided with a groove and the upper housing wall is a spring element for engaging the groove such that the housing parts can be snapped together form-locking by applying pressure and can be separated again by pulling;
    a free beam distance appears between the optical transmission lines to be connected when the connecting housing is joined; and
    optical elements for light beam focussing and/or deflection are arranged in the free beam distance.

2. A connecting housing according to claim 1, wherein
    respectively at least one optical transmission line is inserted parallel to the housing bottom into an opening in the housing wall of both housing parts;
    the groove is installed in the wall of the lower housing part, adjacent to the housing bottom;
    the housing walls of both housing parts contain additional openings at the locations where the optical transmission lines of the other housing part must be inserted into the housing when the two housing parts are joined.

3. A connecting housing according to claim 2, wherein the optical transmission lines in the contact plane of the housing parts are arranged at different angles relative to each other because of fixedly specified openings in the housing walls of the two housing parts.

4. A connecting housing according to claim 1, wherein
    the openings for the optical transmission lines in both housing parts are located in the housing wall, adjacent to the housing bottom, or in the housing bottom itself;
    the groove is inserted above the openings for the optical transmission lines in the housing wall of the lower housing part, at a distance to the upper wall edge and approximately at the level of the housing wall for the upper housing part;
    a snap-in nipple, the shape of which matches the shape of the groove, is provided on the inside edge of the housing wall for the upper housing part, such that when joining the housing parts, the upper housing part snaps into the lower housing part and can be detached again by pulling; and
    when the housing parts are joined, they can be turned relative to each other in the contact plane.

5. A connecting housing according to any one of the preceding claims, wherein the optical transmission lines are provided on the line ends located inside the housing with lenses for parallel light-beam focussing.

6. A connecting housing according to any one of claims 1–4 wherein
    the optical elements are installed in the optical path of the optical transmission lines to deflect the light beam inside the housing;
    the optical elements are mounted on the housing bottom or are integrated into the housing part.

7. A connecting housing according to claim 1, wherein optoelectronic modules are mounted inside the housing parts and are connected to the optical transmission lines.

8. A connecting housing according to claim 1, wherein guide sleeves are inserted into the openings in the housing parts to guide the optical transmission lines.

9. A connecting housing according to claim 1, wherein the housing walls are circular and the groove is annular.

10. A connecting housing according to claim 9, wherein the upper housing part has a larger diameter than the lower housing part.

11. A connecting housing according to claim 2, wherein the housing walls are circular and the groove is annular.

12. A connecting housing according to claim 4, wherein the housing walls are circular and the groove is annular.

* * * * *